United States Patent Office 3,013,024
Patented Dec. 12, 1961

3,013,024
EPOXIDATION OF CARBONYL COMPOUNDS WITH HYDROPEROXIDES
George B. Payne, Berkeley, Calif., assignor to Shell Oil Company, a corporation of Delaware
No Drawing. Filed Aug. 29, 1958, Ser. No. 757,920
10 Claims. (Cl. 260—348.5)

This invention relates to the epoxidation of alpha,beta-ethylenic carbonyl compounds and deals particularly with a new and advantageous method for producing alpha,beta-epoxyaldehydes from the corresponding ethylenic compounds.

The usual methods of epoxidation with organic peracids or the like are not effective for the epoxidation of alpha,beta-ethylenic carbonyl compounds. In copending application Serial No. 738,943 filed June 2, 1958, by George B. Payne, now U.S. Patent 2,947,761, there is described a useful new method of epoxidation of one type of alpha,beta-ethylenic aldehydes, namely the alpha-methylidene alkanals by reaction with hydrogen peroxide. One disadvantage of that method of epoxidation is the danger of loss through oxidation of aldehyde to acid by the hydrogen peroxide in the course of the reaction. It has now been found that alpha,beta-ethylenic aldehydes can be epoxidized and the formation of acidic byproducts can be minimized in the epoxidation of all types of alpha,beta-ethylenic aldehydes by carrying out the epoxidation with an organic hydroperoxide under controlled conditions of alkalinity.

Another advantage of the new method of epoxidizing alpha,beta-ethylenic aldehydes in one of its various modifications, is that the reaction can readily be carried out in an anhydrous or substantially anhydrous system whereby hydration of the epoxyaldehyde product is minimized. A further advantage of the new process is that it can, if desired, be carried out with an excess of organic hydroperoxide to force the reaction of the alpha,beta-ethylenic aldehyde to completion at a faster rate while recovering and reusing the excess hydroperoxide epoxidizing agent. This is in contrast to the epoxidation with hydrogen peroxide in which it is not only generally impractical to recover any excess peroxide but also usually undesirable to use a large excess of peroxide because of its tendency to cause detrimental oxidation. Still other objects and advantages of the new method will be apparent from the following description of the invention.

In accordance with the invention epoxyaldehydes are produced by reacting an alpha,beta-ethylenic aldehyde with an organic hydroperoxide while maintaining the pH of the reaction mixture between about 4 and about 12 and recovering the alpha,beta-epoxyaldehyde which is produced. The reaction takes place in accordance with the equation:

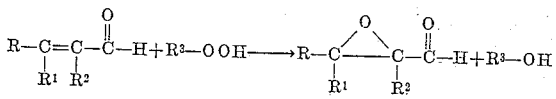

where

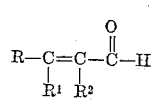

is the alpha,beta-ethylenic aldehyde being epoxidized, R, $R^1$ and $R^2$ being hydrogen atoms or organic radicals, preferably hydrocarbon radicals which can be the same or different, and $R^3OOH$ is the organic hydroperoxide employed as epoxidizing agent, $R^3$ being an organic radical, particularly a hydrocarbon radical. Any two of the radicals R, $R^1$ and $R^2$ can together represent a divalent radical in a cyclic aldehyde.

The desired pH within the range of about 4 to about 12 can be maintained by carrying out the epoxidation in the presence of a basic agent. Either organic or inorganic bases can be used, it being only necessary that the basic agent maintain the indicated pH. Both soluble and insoluble basic agents are effective. Because of their ready availability at low cost, basic inorganic compounds are generally advantageous. Suitable bases of this kind are, for instance, inorganic hydroxides, examples of which are the alkali and alkaline earth hydroxides such as sodium hydroxide, potassium hydroxide, ammonium hydroxide, magnesium hydroxide, calcium hydroxide, etc.; the corresponding oxides, for instance, sodium oxide, calcium or magnesium oxide and the like; and basic salts such as the water-soluble carbonates, bicarbonates, phosphates and the like; such, for instance, as sodium carbonate or bicarbonate, tripotassium phosphate, etc. Among the organic bases which can be used, although generally they are less to be preferred because of their higher cost, are, for instance, amines such as mono-, di- or trimethylamine, the corresponding ethyl and isopropyl amines, and the like, salts of phenols such as potassium and calcium phenates, sodium meta-methyl phenoxide, sodium naphthoxide, etc. There are operating advantages sometimes in using an insoluble form of basic compound. Anion exchange resins, especially amine or quaternary ammonium base resins, are a particularly convenient form of insoluble base for use in the new process. Examples of suitable base resins are, for instance, the amination products of chloromethylated styrene-divinylbenzene copolymers described in U.S. 2,591,573 and sold by Rohm and Haas as "Amberlite IRA–400" and "IRA–401"; resins made by the process of U.S. 2,388,235 and those sold by Dow Chemical Company as "Dowex 1"; anion resins such as "Triton-B," and the like. These may be used in the free base form or in the form of the salts, for instance, the carbonate salts of the strong base resins.

It has been found that the rate of reaction increases as the pH of the mixture is increased. A pH of at least about 4 is desirable in order to avoid unduly slow reaction and usually it is advantageous to maintain a pH of at least 5.5 and more advantageously at least 6.5 in the reaction mixture throughout the reaction. Excessively high pH is to be avoided since it tends to favor formation of undesirable byproduct. For this reason it is generally desirable to operate at a pH not greater than about 12 and more preferably at not above 10. Excellent results have been obtained by controlling the addition of basic agent so as to maintain the pH in the range of about 6.5 to about 8.5. It is one of the advantages of the new process that only very small amounts of basic agent are required to maintain the desired pH because acid formation through oxidation of the aldehydes is minimized as a result of the use of an organic hydroperoxide as the epoxidizing agent.

The alpha,beta-ethylenic aldehyde and organic hydroperoxide epoxidizing agent can be used in a wide variety of proportions. Most preferably a stoichiometric excess of one of these reactants is employed in order to promote complete reaction of the other reactant at a faster rate. With alpha-methylidene alkanals which are more liable to loss through polymerization and other side reactions, an excess of a stable organic peroxide is advantageous because recovery and recycling of the excess reactant is more easily accomplished. When the organic hydroperoxide chosen as epoxidizing agent is one which is more subject to side reactions than the starting alpha,beta-ethylenic aldehyde, it is preferable to employ a molecular excess of the aldehyde in the reactions. As a general rule the mole ratio of alpha,beta-ethylenic aldehyde to organic hydroperoxide which will be used will be in the range of about 0.25:1 to about 4:1, ordinarily between about 0.5:1 and about 2:1 and more preferably between about 0.7:1 and about 1.5:1.

It is usually advantageous to carry out the epoxidation in a liquid medium which serves as a mutual solvent for the ethylenic aldehyde and organic hydroperoxide being used. A desirable reduction in the concentration of the reactants is thus obtained which tends to reduce undesirable side reactions. While aqueous media can be used as the diluent, there are advantages, as previously mentioned, in operation under anhydrous or substantially anhydrous conditions. Especially when epoxidizing an alpha,beta-ethylenic aldehyde of low solubility in water, an organic solvent for the reactants is useful instead of or together with water. Hydrocarbon solvents are one useful type of solvent, especially aromatic hydrocarbon solvents such as benzene, toluene and the xylenes and the like, although aliphatic hydrocarbon solvents such as pentane, hexane, cyclohexane, etc. can be used. Alcohols, particularly the water-soluble alcohols are another group of solvents which are useful, especially the less reactive tertiary alcohols such, for instance, as tertiary butyl alcohol and the like, although other alcohols such as methanol, ethanol, isopropanol, isobutyl alcohol, allyl alcohol, methallyl alcohol, etc. can also be used. Polyhydric alcohols, for instance, ethylene glycol, 2-methyl-2,4-pentanediol, etc. can be similarly used, as can other nonacidic solvents such as ketones, ethers, esters and the like, for example, acetone, methyl ethyl ketone, cyclohexanone, diacetone alcohol, dimethyl ether, ethylene glycol monomethyl ether, ethylene glycol monoacetate, dioxane, etc. Non-reactive solvents, most preferably those which are free from polymerizable ethylenic linkages, are most advantageous. The best results are usually obtained when the reaction is carried out with amounts of liquid solvent or diluent such that the concentration of the reactants in the liquid mixture is not more than about 50% by weight and more preferably is not greater than about 30%.

The reaction is exothermic and usually relatively rapid. The temperature of operation is not highly critical. Temperatures in the range of about 0° to about 100° C. can be employed advantageously, although temperatures of the order of about 20° to about 50° C. will usually be preferred. The higher the reaction temperature the shorter the reaction time which should be used for best results. Thus whereas times as long as about 24 hours or more may be used at about 0° C. or lower, less than 5 minutes' reaction time is desirable when the temperature is increased to 100° C. or higher. When using temperatures above the boiling point of one or both reactants it is preferred to operate under sufficient superatmospheric pressure to maintain the reactants at least partly in the liquid phase.

The new reaction can be carried out in a variety of different ways using batch, intermittent or continuous methods of operation. The reactants can be introduced in any convenient order. One method of batchwise reaction which has been found to be advantageous is to feed the alpha,beta-ethylenic aldehyde in the liquid phase into a solution of the chosen organic hydroperoxide epoxidizing agent in a stirred reactor provided with temperature control means to maintain the desired reaction temperature. Preferably cooling is used with a feed rate adjusted so as to maintain the temperature below about 40° C. It has been found convenient to simultaneously feed a solution of a basic agent into the reaction mixture through a separate feed line at a rate so as to maintain the pH in the mixture within the chosen limits during the reaction. It is feasible, however, to add part or all of the basic agent to the organic hydroperoxide solution at the start of the reaction in this method of operation. Basic acting salts such as sodium bicarbonate, lithium phenoxide, etc. are especially suitable for maintaining the desired pH in this way. Alternatively one can charge only a portion, say about 5% to about 15%, of the organic hydroperoxide to the reactor initially and then feed in alpha,beta-ethylenic aldehyde and organic hydroperoxide separately in approximately stoichiometric proportions while maintaining the required pH as previously indicated until a reactor charge has been completed.

An alternative method of batchwise reaction is to add the chosen base to a stirred solution of the alpha,beta-ethylenic aldehyde and organic hydroperoxide in a suitable solvent of the previously indicated type, using the above described type of reactor.

The process can be carried out continuously in apparatus of the foregoing type, for example, by partially reacting an initial charge of organic hydroperoxide as described above, then continuously adding alpha,beta-ethylenic aldehyde and a stream of organic hydroperoxide separately to the reactor with continuous or intermittent addition of base in the required amount while continuously or intermittently withdrawing epoxyaldehyde-containing reacted mixture from the reactor. The same result can be obtained, usually more advantageously, by using as the reactor a cooler with or without a time tank in series therewith and employing a pump to circulate reaction mixture therethrough as a continuously circulating stream into which the alpha,beta-ethylenic aldehyde, hydroperoxide and basic agent are continuously fed at separate points sufficiently separated from the point of withdrawal of reaction mixture that substantial reaction is achieved before removal of the product-containing mixture from the reactor. Alternatively, the alpha,beta-ethylenic aldehyde can be fed at spaced points along the path of flow of the reaction mixture through a tubular or other suitable form of reactor in which the proper temperature is maintained. Temperature control can be achieved by external cooling or evaporation of a volatile component of the mixture, for instance, a liquefied gaseous hydrocarbon such as butane or isopentane, which can also serve at least in part as the solvent and/or diluent for the reactants, the pressure of the system being regulated so that this volatile component will evaporate at the chosen reaction temperature. As in the previously described modification of the process, hydroperoxide solution and/or a solution of the base being used can be fed, preferably separately, into the stream of reaction mixture at intermediate points between the points of alpha,beta-ethylenic aldehyde feed.

The epoxyaldehyde produced can be recovered from the reaction mixture in any suitable manner, account being taken of the reactive nature of these compounds, especially the tendency of the epoxide ring to undergo hydration in aqueous media, slowly under neutral conditions and more rapidly under acidic or basic conditions. One suitable method of recovering the alpha,beta-epoxyaldehyde product is by distillation, preferably flash distillation under approximately neutral conditions, using reduced pressure, preferably at a temperature below 100° C., more preferably at between about 50° C. and about 60° C. The time of exposure of the epoxyaldehydes to elevated temperatures should be shorter the higher the temperature in order to minimize reactions, particularly hydration of the epoxy group when aqueous mixtures are being treated. The flashed epoxyaldehyde will usually be found to be quite stable after this removal from the salts and can be advantageously used as recovered in aqueous solution or can be isolated in pure or substantially pure form.

Other methods of recovery such as extraction with ether or the like can also be used. Where the epoxyaldehyde produced is desired as an intermediate for further synthesis, it is often advantageous to use the epoxidation mixture for this purpose without isolating the epoxyaldehydes therefrom and such use will constitute recovery of the product. For example, where the epoxyaldehyde is to be converted to the corresponding dihydroxy aldehyde by hydration of the epoxy group, it has been found that the hydration can be carried out successfully without flashing off the epoxyaldehyde from the epoxidation mixture. The hydration can be carried out under alkaline, neutral or acid conditions. A substantial excess of water is desirable for the hydration and preferably the reaction is carried out at epoxyaldehyde concentrations of about 5 to about 25% by weight. Sufficient water may be present in the epoxidation mixture but it will usually be advantageous to add additional water. Heating the neutralized epoxidation mixture at 60° C. to 100° C. has been found to be one suitable method. Higher yields are generally obtained, however, by reaction with water under acid conditions, most preferably at a pH of about 0.5 to about 1.0. Although longer reaction times are required it is usually advantageous to carry out the acid hydration at a temperature of about 50° C. or below, most preferably at about room temperature, when using the epoxidation mixture for the reaction since higher yields can be obtained in this way. Under these preferred conditions the hydration can be completed in about 3 to about 24 hours and yields of alpha,beta-dihydroxyaldehydes of the order of about 95% or higher can be obtained. The alpha,beta-dihydroxyaldehydes which are thus produced can be hydrogenated to the corresponding polyhydroxyhydrocarbons by reaction with hydrogen in the presence of a hydrogenation catalyst. The epoxyaldehyde products can be converted to other useful derivatives via reaction of the epoxy group and/or aldehyde group and any such reaction can be employed for recovery in the process of the invention.

The following examples further illustrate ways of carrying out the new epoxidation process and show some of its advantages.

*Example I*

To a 1-liter flask equipped with funnel was charged 400 ml. of methanol and 71.2 grams (0.60 mole) of 75.9% tert-butyl hydroperoxide. Five ml. of 1N aqueous sodium hydroxide was added and the mixture was warmed to 35-40° C. There was then added dropwise over one hour a solution of 66 grams (0.50 mole) of cinnamaldehyde in 50 ml. of methanol. At the completion of the addition another 5 ml. portion of 1N alkali was added and stirring was continued at 35-40° C. for 1.5 hours longer. At that time the reaction was found to be 82% complete as determined by an iodometric titration for the hydroperoxide. The addition of a final 5 ml. of caustic caused the reaction to go to completion in another 3 hours.

The reaction mixture was poured into 1.5 liters of water and extracted with three 200 ml. portions of chloroform. The combined chloroform extracts were water-washed, dried and concentrated under vacuum on the water bath at <50° C. Claisen distillation of the residue afforded 54 grams (73% yield) of beta-phenyl glycidaldehyde, boiling point 66-68° C. (0.1 mm.), $n$ 20/D 1.5447.

Calculated for $C_9H_8O_2$: C, 73.0; H, 5.4. Found: C, 72.9; H, 5.7.

This result is in contrast with that obtained by analogous reaction using hydrogen peroxide instead of an organic hydroperoxide in which the yield of product boiling in the beta-phenylglycidaldehyde range was only 14% based on cinnamaldehyde converted.

*Example II*

To a stirred mixture of 35 grams (0.50 mole) of crotonaldehyde, 150 ml. of methanol, and 150 ml. of water was added dropwise over 15 minutes at 40-45° C. a solution of 0.50 mole of 95% tert-butyl hydroperoxide in 50 ml. of methanol. The indicated pH of the mixture was maintained at 10-10.5 by the addition of 1N sodium hydroxide as required (true pH about 8.5 measured with pH indicator paper which had been moistened with distilled water). One hours after completion of the addition, 12 ml. of 1N alkali had been utilized and iodometric titration (20% potassium iodide—30% sulfuric acid for 10 minutes in the dark) indicated the presence of 0.09 mole of tert-butyl hydroperoxide (82% conversion). A titration for epoxide content (hydrochloric acid in saturated magnesium chloride) indicated the presence of 0.35 mole of alpha, beta-epoxybutyraldehyde (85% yield based on hydroperoxide converted).

*Example III*

To a stirred solution of 60 grams (0.50 mole) of 75% tert-butyl hydroperoxide in 250 ml. of acetone was added 0.01 mole of 35% benzyl trimethyl ammonium hydroxide (solution in methanol). The mixture was warmed to 40 C. and 0.55 mole of crotonaldehyde was added dropwise with cooling over 0.5 hour. At the end of the addition, another 0.01 mole of catalyst was added and the reaction was 96% complete (iodometric titration) in another 1.5 hours. Titration for epoxide indicated the presence of 0.30 mole of alpha,beta-epoxybutyraldehyde (60% yield).

Good results can also be obtained by similar reaction using ethyl hydroperoxide in place of tertiary butyl hyproperoxide.

*Example IV*

To a stirred solution of tert-butyl hydroperoxide and 5,6-dihydro-1,2-pyran-3-carboxaldehyde

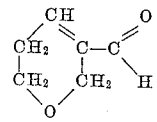

in about equal mole proportions in benzene is added a 35% methanolic solution of benzyltrimethyl ammonium hydroxide solid under the trade name "Triton-B" by Mid-West Laboratories, Inc. (approximately 0.03 mole per mole of hydroperoxide) and after about 5 hours at room temperature, analysis shows a good yield of 3-formyl-3,4-epoxytetrahydropyran

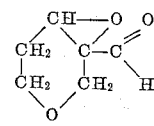

*Example V*

To a stirred mixture of 150 ml. of methanol, 150 ml. of water and 0.55 mole of 76% tert-butyl hydroperoxide was added 2 ml. of 1N sodium hydroxide to adjust the pH to about 8-9 (indicator paper; the pH as read by a pH meter was 10.7). The mixture was warmed to 35-38° C. and 0.50 mole of acrolein was added dropwise over 20 minutes, keeping the indicated pH at 10-10.5 by the further addition of a small amount of alkali as needed. About 1 hour after completion of the addition, a total of 3 ml. of alkali had been added, correspondinging to only 0.6 mole percent of acidic by-product formed. Iodometric titration indicated the consumption of 0.41 mole of hydroperoxide and titration for epoxide indicated the presence of 0.31 mole of glycidaldehyde (76% yield based on hydroperoxide converted).

When peracetic acid was reacted with acrolein in the presence of added sodium hydroxide, titration showed that the yield of epoxide was only 25% and the epoxide was largely glycidic acid rather than glycidaldehyde.

*Example VI*

Epoxidation of methacrolein by reaction with alpha, alpha-dimethylbenzyl hydroperoxide under conditions similar to those of Example V affords a good yield of epoxyisobutyraldehyde, boiling 51-53° C. at 80 mm. pressure.

It will be understood that the foregoing examples are merely illustrative and that the present invention broadly comprises reacting an alpha,beta-ethylenic carbonyl compound with an organic hydroperoxide at a pH of about 4 to about 12 and recovering the alpha,beta-epoxycarbonyl compound which is produced. Specific alpha,beta-ethylenic aldehydes, other than those used in the example, well adapted for conversion to the corresponding alpha, beta-epoxyaldehydes by the new process, include aliphatic aldehydes, typical of which are alpha-ethylacrolein, alpha-isopropylacrolein, alpha-hexylacrolein, alpha-ethylacrolein, beta-methylcrotonaldehyde, beta-cyclohexylacrolein, beta-methyl-beta-isopropylacrolein, alpha-methyl-beta,beta-diethylacrolein, geranial, alpha-isopropylcrotonaldehyde, and beta-allylacrolein. Representative alpha,beta-ethylenic aromatic aldehydes are alpha-methyl cinnamyl aldehyde, gamma-benzyl crotonaldehyde, beta-(para-chlorophenyl)acrolein, meta-nitrocinnamyl aldehyde, ortho-hydroxycinnamyl aldehyde, para-methoxycinnamyl aldehyde, piperonyl acrolein and ortho-nitro-cinnamylidene-acetaldehyde. Other alpha,beta-ethylenic cyclic aldehydes which can be successfully epoxidized in the same way are, for instance $\Delta^1$-or beta-cyclocitral, $\Delta^1$-tetrahydrobenzaldehyde, 4-methyl-$\Delta^1$-tetrahydrobenzaldehyde and $\Delta^{1,4}$-dihydrobenzaldehyde. Heterocyclic alpha,beta-ethylenic aldehydes besides those of the foregoing examples which can be similarly reacted include 4,5-dihydrofurfural, alpha-methyl furfural, dihydrothiophenealdehyde, 1-benzoyl-5-formyl-1,2,2a,3-tetrahydrobenz(c,d)indole, and the like. When using alpha,beta-ethylenic aldehydes having more than one multiple linkage between carbon atoms in the molecule, as is the case with geranial and beta-allylacrolein mentioned above, it is a feature of the new process of the invention that the ethylenic linkage alpha,beta to the aldehyde group is selectively epoxidized giving unsaturated epoxyaldehydes which are valuable new compounds otherwise difficult to synthesize. Thus from geranial and beta-allylacrolein there are obtained alpha,beta-epoxy geranial and 2,5-epoxyhexen-5-al, respectively. In general, the most favorable yields and conversions have been obtained with alpha,beta-ethylenic aldehydes having 3 to 20 carbon atoms per molecule, especially good results being obtained with alpha,beta-ethylenic hydrocarbon aldehydes of 3 to 10 carbon atoms. The new process of this invention is of particular value in the epoxidation of alpha,beta-ethylenic aliphatic hydrocarbon aldehydes of 3 to 10 carbon atoms per molecule.

Organic hydroperoxides which can be used as the epoxidizing agent instead of the hydroperoxides of the foregoing examples include, for instance: chloro-tertiary butyl hydroperoxide, para-menthane hydroperoxide, tertiary amyl hydroperoxide, lauryl hydroperoxide, benzyl hydroperoxide, cyclohexyl hydroperoxide, cyclohexene hydroperoxide, bromo-tertiary-butyl hydroperoxide, eicosyl hydroperoxide and 1,1-dichloromethylpropyl hydroperoxide. Hydroperoxides containing not more than about 20 carbon atoms are of the molecular size preferred for employment in the process of the invention. Hydrocarbon hydroperoxides of 1 to 20 carbon atoms per molecule are a useful subgroup of oxidizing agents for the reaction.

A particularly suitable class of hydroperoxides, for employment in the process of the invention, consists of the tertiary hydrocarbon peroxides and their halogen-analogs containing one or more chlorine or bromine atoms. This class includes, for example, such substituted or unsubstituted tertiary alkyl hydroperoxides as tertiary butyl hydroperoxide, alpha,alpha-dimethylbenzyl hydroperoxide, chlorotertiary butyl hydroperoxide, 1-chloromethyl-1-bromomethylpropyl hydroperoxide as well as 1-methylcyclohexyl hydroperoxide. However, other hydroperoxides from non-acidic compounds such as methyl ethyl ketone, etc. can also be used.

The alpha,beta-epoxy aldehydes made available by the new process are valuable compounds. In addition to their use as intermediates in the manufacture of polyols having numerous established applications as shown in the foregoing examples, they are useful for other purposes. They can be reacted with polycarboxylic acids or polyhydric alcohols at the epoxy group to form resinous polyesters and polyethers which can be cured by crosslinking through the aldehyde groups in making surface coatings, moldings and castings. It will therefore be seen that the invention offers many advantages. It is not restricted to the examples which have been given by way of illustration, nor by any theory proposed in explanation of the improved results which are attained. By pH as referred to in the following claims is meant the pH of the mixture as measured by standard pH indicator paper which has been premoistened with distilled water.

I claim as my invention:

1. In a process for oxidizing alpha,beta-ethylenic aldehyde of 3 to 20 carbon atoms per molecule to the corresponding alpha,beta-epoxy aldehyde the improvement which comprises contacting said ethylenic aldehyde with a hydroperoxy-substituted hydrocarbon of 1 to 20 carbon atoms at a pH between about 4 and about 12 and recovering the alpha,beta-epoxy aldehyde product of the reaction.

2. In a process for oxidizing aldehyde-substituted hydrocarbon of 3 to 20 carbon atoms per molecule having an ethylenic group in alpha,beta position with respect to the aldehyde group to convert said ethylenic group to an alpha,beta-epoxy group, the improvement which comprises using as oxidizing agent hydroperoxy-substituted hydrocarbon of 1 to 20 while adding sufficient base to maintain the pH of the mixture between about 4 and about 12 throughout the reaction and recovering the alpha,beta-epoxyaldehyde product of the reaction.

3. A process in accordance with claim 2 wherein the basic agent is an alkali metal compound added in an amount sufficient to maintain the pH between about 6.5 and about 9.

4. A process in accordance with claim 2 wherein the reaction is carried out by passing the reactants through a bed of solid quaternary ammonium hydroxide anion exchange resin.

5. In a process for producing alpha,beta-epoxyaldehyde by oxidizing the corresponding alpha,beta-ethylenic aliphatic hydrocarbon aldehyde of 3 to 20 carbon atoms per molecule, the improvement which comprises reacting said ethylenic aldehyde with hydroperoxy-substituted hydrocarbon of 1 to 20 carbon atoms per molecule in mole proportions of about 0.25:1 to about 4:1 at about 0° to about 100° C. while maintaining the reaction mixture at a pH between about 4 and about 12 and recovering the alpha,beta-epoxyaldehyde product of the reaction.

6. A process in accordance with claim 5 wherein the hydrocarbon peroxide is cumene hydroperoxide.

7. A process in accordance with claim 5 wherein the hydrocarbon peroxide is para-menthane hydroperoxide.

8. A process wherein glycidaldehyde is produced by reacting acrolein with tertiary butyl hydroperoxide at a pH between about 4 and about 12.

9. A process wherein alpha,beta-epoxybutyraldehyde is produced by reacting crotonaldehyde with tertiary butyl hydroperoxide at a pH between about 4 and about 12.

10. A process for producing beta-phenylglycidaldehyde which comprises reacting cinnamaldehyde with a tertiary alkyl hydrocarbon hydroperoxide of 4 to 20 carbon atoms at a pH between about 4 and about 12.

References Cited in the file of this patent

UNITED STATES PATENTS

| | | |
|---|---|---|
| 2,373,942 | Bergsteinsson | Apr. 17, 1945 |
| 2,500,599 | Bergsteinsson et al. | Mar. 14, 1950 |
| 2,764,497 | Mika et al. | Sept. 25, 1956 |
| 2,783,250 | Payne et al. | Feb. 26, 1957 |
| 2,833,788 | Skinner et al. | May 6, 1958 |
| 2,887,498 | Hearne et al. | May 19, 1959 |
| 2,938,040 | Skinner et al. | May 24, 1960 |

(Other references on following page)

FOREIGN PATENTS

| | | |
|---|---|---|
| 529,388 | Belgium | June 30, 1954 |
| 531,112 | Canada | Oct. 2, 1956 |
| 552,808 | Canada | Feb. 4, 1958 |

OTHER REFERENCES

Weitz et al.: Berichte der Deutch. Chem. Gesell., vol. 54, pages 2334–2336 (1921).

Braun: J. A. C. S., vol. 52, pages 3185–3188 (1930), 260–348, 5LL.

Tamaka: Chemical Abstracts, vol. 34, page 403 (1940).

Swern: J. A. C. S., vol. 69, pages 1692–1698 (1947).

Friess: Tech. of Org. Chem., vol. 8, pages 411–13 (1953).

Gall et al.: Journ. of American Oil Chem. Soc., vol. 34, pages 161–164 (1957).